United States Patent
Sawatari et al.

(10) Patent No.: US 7,402,332 B2
(45) Date of Patent: Jul. 22, 2008

(54) LIQUID CRYSTAL DISPLAY

(75) Inventors: Naoko Sawatari, Tokyo (JP); Masato Okabe, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 401 days.

(21) Appl. No.: 11/054,821

(22) Filed: Feb. 10, 2005

(65) Prior Publication Data

US 2006/0083868 A1 Apr. 20, 2006

(30) Foreign Application Priority Data

Feb. 10, 2004 (JP) .............................. 2004-033327

(51) Int. Cl.
C09K 19/38 (2006.01)
C09K 19/52 (2006.01)
G02F 1/133 (2006.01)

(52) U.S. Cl. .................... 428/1.3; 428/1.1; 428/1.2; 349/172; 349/183

(58) Field of Classification Search ............. 428/1.1, 428/1.2, 13; 349/123, 133, 172, 183; 252/299.01
See application file for complete search history.

(56) References Cited

U.S. PATENT DOCUMENTS

| | | | | |
|---|---|---|---|---|
| 2001/0024261 A1* | 9/2001 | Choi et al. | ................. | 349/187 |
| 2003/0125435 A1* | 7/2003 | Norling et al. | ............... | 524/287 |
| 2005/0233094 A1* | 10/2005 | Sawatari et al. | ............... | 428/1.1 |
| 2006/0038949 A1* | 2/2006 | Okabe et al. | ................. | 349/133 |
| 2006/0082719 A1* | 4/2006 | Okabe et al. | ................. | 349/172 |

FOREIGN PATENT DOCUMENTS

JP 2003-172935 6/2003

OTHER PUBLICATIONS

Nonaka, T., Li, J., Ogawa, A., Hornung, B., Schmidt, W., Wingen, R., and Dubal, H., 1999, Liq. Cryst., 26, 1599., Fig 4.

* cited by examiner

*Primary Examiner*—Shean C Wu
(74) *Attorney, Agent, or Firm*—Ladas & Parry LLP

(57) ABSTRACT

A main object of the present invention is to provide a liquid crystal display using a ferroelectric liquid crystal, showing the mono-stability operation mode using a material showing the chiral smectic C phase via the smectic A phase in the temperature lowering process as the ferroelectric liquid crystal.

The present invention achieves the object by providing a reactive liquid crystal layer having a reactive liquid crystal fixed on at least one facing surface of the two alignment films in a liquid crystal display comprising two aligned substrates comprising a substrate, an electrode layer and an alignment film, disposed so as to have the alignment films face with each other, and a ferroelectric liquid crystal sandwiched between the aligned substrates.

12 Claims, 4 Drawing Sheets

LAYER NORMAL LINE

LIQUID CRYSTAL DISPLAY

BACKGROUND OF THE INVENTION

1. Field of the Invention

The present invention relates to liquid crystal display using ferroelectric liquid crystal.

2. Description of the Related Art

Since liquid crystal display has features that it is thin and is low in power consumption and other features, the use thereof has been expanding in various articles from large-sized displays to portable information terminals and the development thereof has been actively made. Conventionally, for liquid crystal display, a TN system, an STN multiplex driving system, an active matrix driving system in which thin film transistors (hereinafter, it may be referred to as "TFT element") are used in TN, and others have been developed and made practicable. However, nematic liquid crystal is used therein; therefore, the response speed of the liquid crystal material is as small as several milliseconds to several tens of milliseconds and it cannot be said that these sufficiently cope with display of moving images.

Ferroelectric liquid crystal (FLC) exhibits a very short response time in order of microseconds, and thus FLC is a liquid crystal suitable for high-speed devices. About ferroelectric liquid crystal, there is well known a bistable liquid crystal which has two stable states when no voltage is applied thereto and is suggested by Clark and Lagerwall (FIG. 4). However, the liquid crystal has a problem that the liquid crystal has memory property but graduation display cannot be attained since the switching thereof is limited to two states, namely, bright and dark states.

In recent years, attention has been paid to ferroelectric liquid crystal in which the liquid crystal layer thereof is stable in a single state (hereinafter referred to as "monostable") when no voltage is applied thereto as a liquid crystal making it possible to attain graduation display by the matter that the director (the inclination of the molecule axis) of the liquid crystal is continuously changed by a change in applied voltage so as to analogue-modulate the light transmission thereof (NONAKA, T., LI, J., OGAWA, A., HORNUNG, B., SCHMIDT, W., WINGEN, R., and DUBAL, H., 1999, Liq. Cryst., 26, 1599., FIG. 4).

As the liquid crystal showing such mono-stability, in general, a ferroelectric liquid crystal having the phase change of cholesteric phase (Ch)-chiral smectic C (SmC*) phase without the transition to the smectic A (SmA) phase in the temperature lowering process is used.

On the other hand, as the ferroelectric liquid crystal, there is a material having the phase change of Ch-SmA-SmC* so as to show the SmC* phase via the SmA phase in the temperature lowering process. Among the ferroelectric liquid crystal material reported so far, most of them are those having such a phase sequence compared with the former material without the transition to the SmA phase. It is known that such a ferroelectric liquid crystal having such a phase sequence in general has two stable states with respect to one layer normal line so as to show the bi-stability (FIG. 5).

As a method for processing such ferroelectric liquid crystal for providing the mono-stability, a polymer stabilizing method can be presented. The polymer stabilizing method is a stabilization method by injecting a ferroelectric liquid crystal mixed with an ultraviolet curable monomer in a liquid crystal cell with the alignment process applied, and executing the ultraviolet ray irradiation in a state with the direct current or alternative current voltage applied for the polymerization. However, a problem is involved in that the production process is complicated and the driving voltage is made higher.

In general, as the technique for subjecting liquid crystal to alignment process, there is known a method of using an alignment film. The method is classified into the rubbing method and the photo alignment method. The rubbing method is a method of subjecting a substrate coated with a polyimide film to rubbing treatment to align chains of the polyimide polymer in the direction of the rubbing, thereby aligning liquid crystal molecules on the film. The rubbing method is excellent in controllability of the alignment of nematic liquid crystal, and is generally an industrially applicable technique. However, according to this method, there are problems of the static electricity or dust generation, unevenness of the alignment limiting force or the tilt angle due to the rubbing condition difference, irregularity at the time of the large area process, or the like. Compared with the nematic liquid crystal, due to the high molecule order, the alignment control is difficult, and thus it is not suitable for the alignment processing method for the ferroelectric liquid crystal, which can easily generate the alignment defect.

On the other hand, the photo alignment method is for aligning the liquid crystal molecule of the film by directing a light bean with the polarization control to a polymer or a monomolecale for generating the photo excitation reaction (decomposition, isomerization, dimerization) so as to provide the anisotropy to the polymer film or the monomolecular film. This method is advantageous in that the quantitative alignment process can be controlled without generation of the static electricity or the dusts, which is the problem of the rubbing method. However, even by using this method, an example of realizing the mono-stability operation mode using the ferroelectric liquid crystal essentially having the bi-stability has not been found so far. Therefore, in order to realize the highly precise color display by the color filter system or the field sequential color system by enabling the graduation display, due to the narrow material selection range for the ferroelectric liquid crystal, it has been difficult to achieve the various demanded characteristics.

SUMMARY OF THE INVENTION

A main object of the present invention is to provide a liquid crystal display using a ferroelectric liquid crystal, showing the mono-stability operation mode using a material showing the chiral smectic C phase via the smectic A phase in the temperature lowering process as the ferroelectric liquid crystal.

As a result of the elaborate discussion with regard to the above-mentioned circumstances, the present inventors have found out that the ferroelectric liquid crystal having the phase sequence as mentioned above shows the mono-stability operation mode by providing a reactive liquid crystal layer having a reactive liquid crystal fixed on at least one facing surface of two alignment films for controlling the alignment of the ferroelectric liquid crystal so as to complete the present invention.

That is, the present invention provides a liquid crystal display comprising a reactive liquid crystal side substrate having a first substrate, an electrode layer formed on the above-mentioned first substrate, a first alignment layer formed on the above-mentioned electrode layer, and a reactive liquid crystal layer with a reactive liquid crystal fixed, formed on the above-mentioned first alignment layer, and a counter substrate having a second substrate, an electrode layer formed on the above-mentioned second substrate, and a second alignment layer formed on the above-mentioned electrode layer, wherein the reactive liquid crystal layer of the above-mentioned UV curable liquid crystal side substrate and the second alignment layer of the above-mentioned counter substrate are disposed so as to face with each other such that a ferroelectric liquid crystal is sandwiched between the above-mentioned reactive liquid crystal side substrate and the above-mentioned counter substrate, and wherein the above-mentioned ferroelectric liquid crystal shows a chiral smectic C phase via a smectic A phase in a temperature lowering process, and it shows a mono-stability in the above-mentioned chiral smectic C phase.

According to the present invention, since the above-mentioned reactive liquid crystal layer is fixed on the above-mentioned first alignment layer, the reactive liquid crystal layer can function as the alignment film for aligning the ferroelectric liquid crystal. Moreover, since the above-mentioned reactive liquid crystal has a structure relatively similar to that of the ferroelectric liquid crystal, the interaction with the ferroelectric liquid crystal is reinforced so that the ferroelectric liquid crystal alignment can be controlled more effectively than the case of using only the alignment film. According to the present invention, since such a reactive liquid crystal layer is provided, the mono-stability operation mode can be realized using a ferroelectric liquid crystal showing the. SmC* phase via the SmA phase in the temperature lowering process without generating the alignment defect such as a zigzag defect and a hairpin defect. Moreover, since the present invention is for controlling the alignment using an alignment film and a reactive liquid crystal without depending on the electric field induced technique (which used DC voltage during cooling process), the alignment can be maintained even in the case the temperature is raised to the phase transition point or higher so as to restrain the generation of the alignment disturbance, and thus it is advantageous.

In the above-mentioned invention, it is preferable that a second reactive liquid crystal layer with the reactive liquid crystal fixed on the above-mentioned second alignment layer is formed, and the reactive liquid crystal comprising the above-mentioned reactive liquid crystal layer and the reactive curable liquid crystal comprising the above-mentioned second reactive liquid crystal layer are different compositions.

Since the second reactive liquid crystal layer with the reactive liquid crystal fixed is formed also on the counter surface of the second alignment layer, the effect to be obtained by forming the above-mentioned reactive liquid crystal layer can further be reinforced so that the alignment of the ferroelectric liquid crystal can be controlled further effectively. Moreover, since the reactive liquid crystal comprising the above-mentioned reactive liquid crystal layer and the reactive liquid crystal comprising the above-mentioned second reactive liquid crystal layer have different compositions, generation of the alignment defect such as a zigzag defect and a hairpin defect can be restrained so that the mono-domain alignment of the ferroelectric liquid crystal can be obtained.

In the above-mentioned invention, it is preferable that the above-mentioned reactive liquid crystal shows a nematic phase. The nematic phase allows the alignment control relatively easily among the liquid crystal phases.

Moreover, according to the above-mentioned invention, it is preferable that the above-mentioned reactive liquid crystal has a polymerizable liquid crystal monomer. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

Furthermore, according to the above-mentioned invention, it is preferable that the above-mentioned polymerizable liquid crystal monomer is a monoacrylate monomer or a diacrylate monomer. The monoacrylate monomer or the diacrylate monomer can easily be polymerized while preferably maintaining the aligned state.

Still further, according to the above-mentioned invention, it is preferable that the above-mentioned diacrylate monomer is a compound represented by the below-mentioned formula (1):

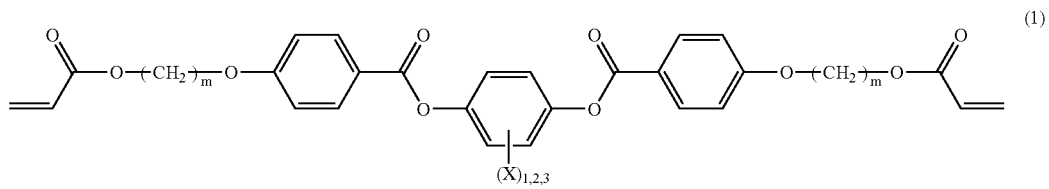

(Here, X in the formula is a hydrogen, an alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro, and m is an integer in a range of 2 to 20.)

Furthermore, according to the above-mentioned invention, it is preferable that the above-mentioned diacrylate monomer is a compound represented by the below-mentioned formula (2):

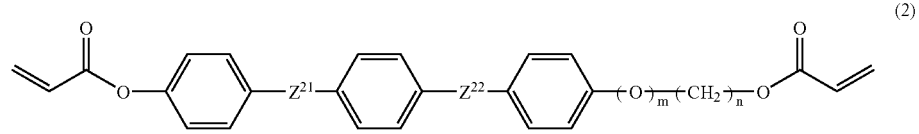

(Here, $Z^{21}$ and $Z^{22}$ in the formula are each independently directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—, m is 0 or 1, and n is an integer in a range of 2 to 8.)

Moreover, according to the above-mentioned invention, it is preferable that the above-mentioned first alignment layer and the above-mentioned second alignment layer are a photo alignment layer. Since the photo alignment process at the time of forming a photo alignment layer is a non contact alignment process, it is effective in that the quantitative alignment process can be controlled without generation of the static electricity or the dusts.

Furthermore, according to the above-mentioned invention, it is preferable that a constituent material for the above-mentioned photo alignment layer is a photoreactive material for providing an anisotropy to the above-mentioned photo alignment layer by generating a photoreaction, or a photo isomerization type material including a photo isomerization-reactive compound for providing the anisotropy to the above-mentioned photo alignment layer by generating a photo isomerization reaction. By using such a material, the anisotropy can be provided easily to the photo alignment layer.

Still further, according to the above-mentioned invention, it is preferable that the above-mentioned ferroelectric liquid crystal comprises a single phase. According to the present invention, since a preferable alignment can be obtained even with a single phase ferroelectric liquid crystal without the need of using a method such as a polymer stabilizing method for controlling the alignment so as to facilitate the production process easily while lowering the driving voltage, the effect of the present invention can be provided further remarkably by using the ferroelectric liquid crystal comprising a single phase.

The liquid crystal display in the present invention is preferably driven by an active matrix system using thin film transistors since the adoption of the active matrix system using TFT elements makes it possible to switch on or off target pixels surely to give high-quality display. Furthermore, it is possible to combine a TFT substrate, in which TFT elements are arranged in a matrix form on one of the substrates, with a common electrode substrate, in which a common electrode is formed in the whole of the display section of the other substrate, form a micro color filter in which TFT elements are arranged in a matrix form between the common electrode of the common electrode substrate and the substrate thereof, and use the resultant as color liquid crystal display.

Moreover, the liquid crystal display in the present invention is preferably driven by a field sequential color system for the following reason: the liquid crystal display has a large response speed and makes it possible to align the ferroelectric liquid crystal therein without forming any alignment defect; therefore, when the display is driven by the field sequential color system, bright and highly precise display of color moving images which has a wide view angle can be realized at low costs and low power consumption.

DESCRIPTION OF THE PREFERRED EMBODIMENT

Hereinafter, a liquid crystal display of the present invention will be explained in detail. The liquid crystal display of the present invention is a liquid crystal display comprising a reactive liquid crystal side substrate having a first substrate, an electrode layer formed on the first substrate, a first alignment layer formed on the electrode layer, and a reactive liquid crystal layer with a reactive liquid crystal fixed, formed on the above-mentioned first alignment layer, and a counter substrate having a second substrate, an electrode layer formed on the second substrate, and a second alignment layer formed on the electrode layer, disposed so as to have the reactive liquid crystal layer of the above-mentioned reactive liquid crystal side substrate and the second alignment layer of the above-mentioned counter substrate face with each other, with the ferroelectric liquid crystal sandwiched between the above-mentioned reactive liquid crystal side substrate and the above-mentioned counter substrate, and wherein the above-mentioned ferroelectric liquid crystal shows the chiral smectic C phase via the smectic A phase in the temperature lowering process, and it shows the mono-stability in the above-mentioned chiral smectic C phase.

Figure 3:
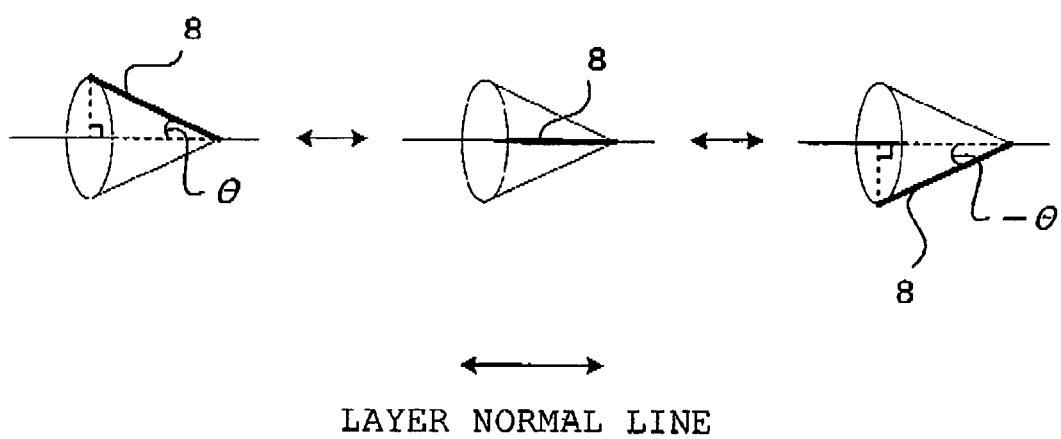
FIG. 3 is a schematic diagram showing the behavior of the ferroelectric liquid crystal molecule.
Figure 4:
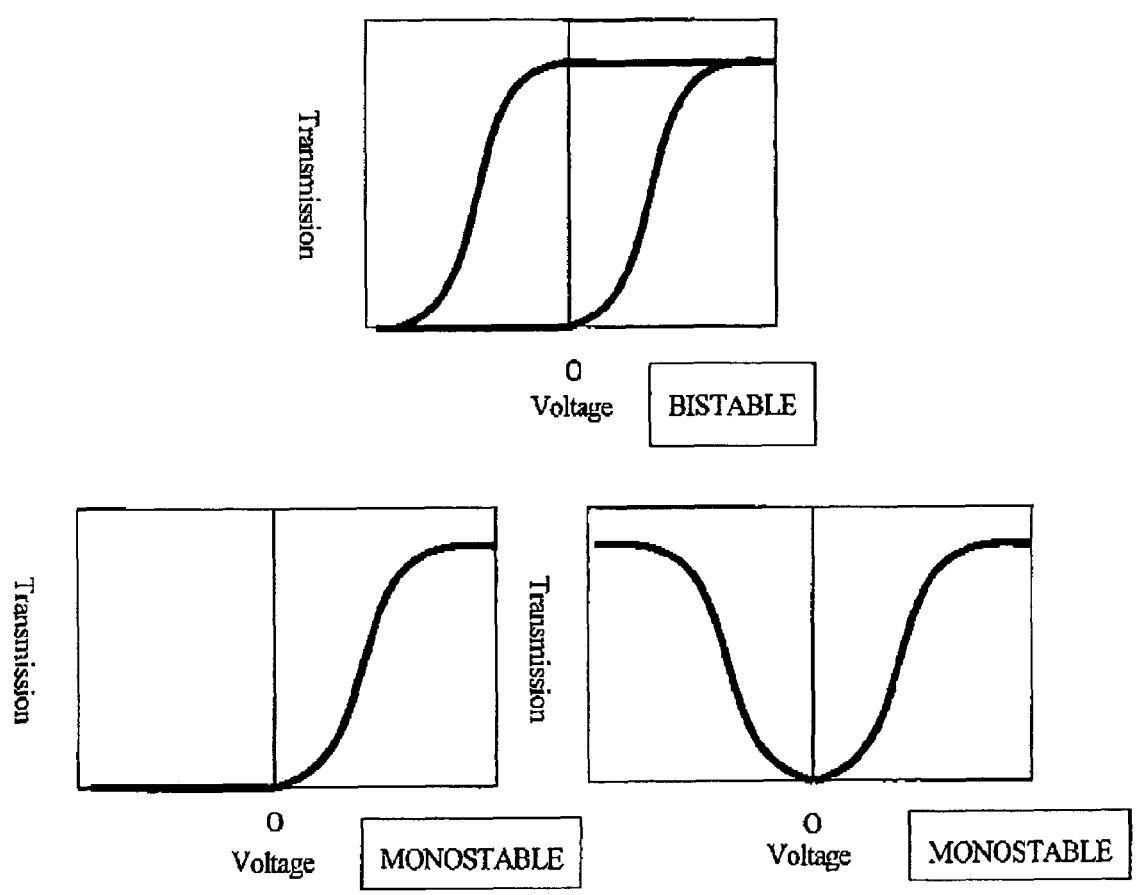
FIG. 4 is a graph showing changes in transmission as a function of voltage applied to ferroelectric liquid crystals.
Figure 5:
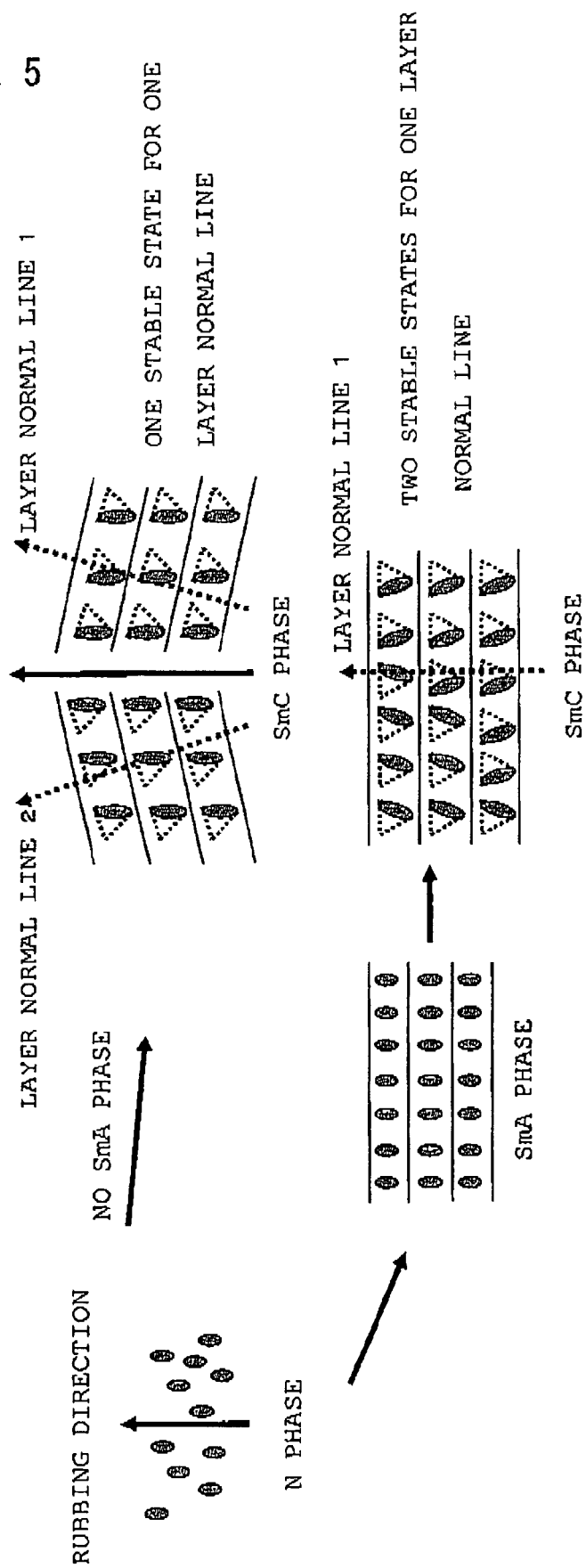
FIG. 5 is a view illustrating a difference of alignment defects based on a difference of the phase series that ferroelectric liquid crystal has.

Here, "to show the mono-stability" denotes a state wherein the liquid crystal layer without the voltage application is stabilized as mentioned above. More specifically, as shown in FIG. 3, the ferroelectric liquid crystal molecule 8 having two stable states inclined by an angle only for a tilt angle ±θ with respect to the layer normal, is capable of moving on a cone between the two stable states. It denotes the state wherein the ferroelectric liquid crystal molecule 8 is stabilized in either one state on the above-mentioned cone at the time without the voltage application.

Figure 1:
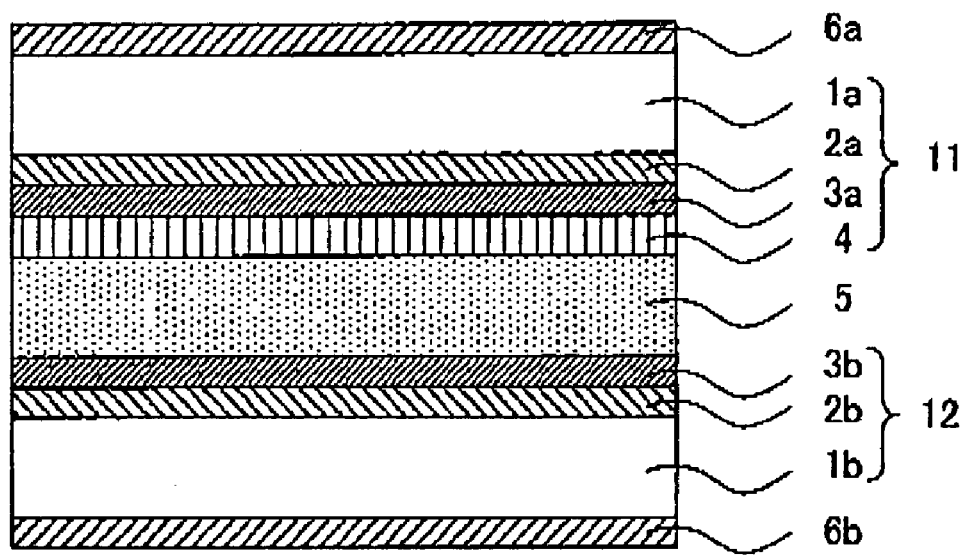
FIG. 1 is a schematic sectional view illustrating one example of the liquid crystal display of the present invention.

Such a liquid crystal display of the present invention will be explained with reference to the drawings. FIG. 1 is a schematic cross-sectional view showing an example of a liquid crystal display of the present invention. As it is shown in FIG. 1, the liquid crystal display of the present invention comprises a reactive liquid crystal side substrate 11 having a first substrate 1a, an electrode layer 2a formed on the first substrate 1a, a first alignment layer 3a formed on the electrode layer 2a, and a reactive liquid crystal layer 4 formed on the first alignment layer 3a, and a counter substrate 12 having a second substrate 1b, an electrode layer 2b formed on the second substrate 1b, and a second alignment layer 3b formed on the electrode layer 2b. Furthermore, a ferroelectric liquid crystal is sandwiched between the reactive liquid crystal layer 4 of the reactive liquid crystal side substrate 11 and the second alignment layer 3b of the counter substrate 12 so as to provide a liquid crystal layer 5.

According to the present invention, since the reactive liquid crystal layer 4 is formed on the first alignment layer 3a, the reactive liquid crystal comprising the reactive liquid crystal layer 4 is aligned by the above-mentioned first alignment layer 3a so that the reactive liquid crystal layer 4 is formed by fixing the aligned state of the reactive liquid crystal by polymerizing the reactive liquid crystal by for example polymerization with an ultraviolet ray. Accordingly, since the reactive liquid crystal layer 4 has the aligned state of the reactive liquid crystal fixed, it has the function as an alignment film for aligning the ferroelectric liquid crystal comprising the liquid crystal layer 5. Furthermore, since the reactive liquid crystal comprising the reactive liquid crystal layer has a structure relatively similar to that of the ferroelectric liquid crystal, the interaction with the ferroelectric liquid crystal can be reinforced so that the alignment can be controlled more effectively than the case of using only an alignment film.

According to the liquid crystal display of the present invention, since the reactive liquid crystal layer is formed on the counter surface of the first alignment layer, the mono-stability operation mode can be realized by using a ferroelectric liquid crystal having the phase change to the SmC* phase via the SmA phase in the temperature lowering process. As a ferroelectric liquid crystal having such a phase sequence, the layer interval of the smectic layer is shortened in the phase change process so as to have a chevron structure with the smectic layer bent for compensating the volume change. According to the bent direction, a domain having a different longer axis direction of the liquid crystal molecule is formed so as to easily generate the alignment defect called the zigzag defect or the hairpin defect in the boundary surface. However, according to the present invention, since the ferroelectric liquid crystal can be aligned without generating such an alignment defect, it is advantageous in that the contrast deterioration by the light leakage can be prevented. The present invention causes the ferroelectric liquid crystal to be aligned without using the electric field induced technique (which uses DC voltage during cooling process); therefore, the invention has advantages that alignment disturbance, which is based on a rise in the temperature of the liquid crystal up to not lower than the phase transition point thereof and is a problem of the electric field induced technique is not easily generated so that the invention is excellent in alignment stability.

Moreover, according to the liquid crystal display of the present invention, for example as shown in FIG. 1, polarizing plates 6a and 6b may be provided outside the first substrate 1a and the second substrate 1b. Thereby, the incident light beam can be a straight polarized light beam so that only the light bean polarized in the alignment direction of the liquid crystal molecule can be transmitted. Since a ferroelectric liquid crystal showing the mono-stability operation mode is used as the liquid crystal layer 5, by controlling the transmitted light amount by the applied voltage, the graduation display can be enabled.

Figure 2:
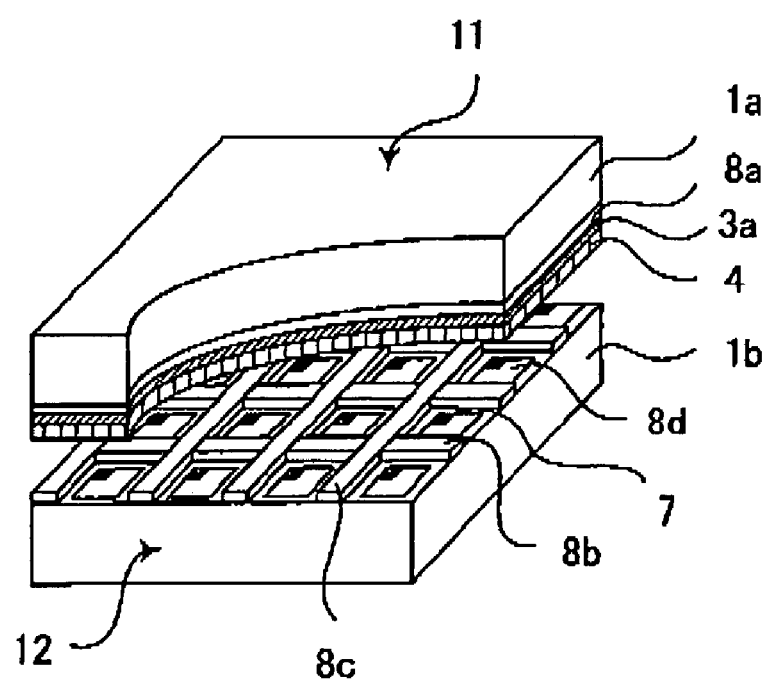
FIG. 2 is a schematic perspective view illustrating the example of the liquid crystal d-splay of the present invention.

Furthermore, according to the liquid crystal display of the present invention, for example as shown in FIG. 2, it is preferable that the counter substrate 12 is provided as a TFT substrate with thin film transistors (TFT element) 7 disposed as a matrix, and the reactive liquid crystal side substrate 11 is provided as a common electrode substrate with a common electrode 8a formed in the entire region so that the two substrates are provided as a combination. Such liquid crystal display of an active matrix system using TFT elements will be described hereinafter.

In FIG. 2, in the reactive liquid crystal side substrate 11, its electrode layer is the common electrode 8a, and thus the substrate is a common electrode substrate. On the other hand, in the opposite substrate 12, its electrode layer is composed of the x electrodes 8b, the y electrodes 8c and the pixel electrodes 8d, and thus the substrate is a TFT substrate. In this liquid crystal display, the x electrodes 8b and the y electrodes 8c are arranged lengthwise and crosswise, respectively. When signals are added to these electrodes, the TFT elements 7 are worked so as to drive the ferroelectric liquid crystal. Regions where the x electrodes 8b and the y electrodes 8c cross are insulated with an insulator layer, which is not illustrated. Signals to the x electrodes 8b and signals to the y electrodes 8c can be independently operated. Any region surrounded by the x electrodes 8b and the y electrodes 8c is a pixel, which is a minimum unit for driving the liquid crystal display of the invention. At least one out of the TFT elements 7 and at least one out of the pixel electrodes 8d are fitted to each of the pixels. In the liquid crystal display of the invention, the TFT elements 7 of the respective pixels can be worked by applying signal voltages successively to the x electrodes 8b and the y electrodes 8c. In FIG. 2, the liquid crystal layer and the second alignment layer are omitted.

Such a liquid crystal display of the present invention can be used as a color liquid crystal display by adopting the color filter system or the field sequential color system. For example, in the case the color filter system is adopted, a micro color filter with the TFT elements disposed in a matrix may be formed between the above-mentioned common electrode 8a and the first substrate 1a.

Although the side with the common electrode 8a formed is the reactive liquid crystal side substrate 11 and the side with the TFT elements 7 and the pixel electrodes 8d, or the like formed is the counter substrate 12 in FIG. 2, the liquid crystal display of the present invention is not limited to such a configuration. The side with the common electrode formed may be the counter substrate and the side with the TFT elements, the pixel electrodes, or the like may be the reactive liquid crystal side substrate. The constituent members of such a liquid crystal display of the present invention will each be explained in detail hereinafter.

1. Constituent Members for the Liquid Crystal Display (1) UV Curable Liquid Crystal Side Substrate First, the reactive liquid crystal side substrate will be explained. The reactive liquid crystal side substrate in the present invention comprises a first substrate, an electrode layer formed on the first substrate, a first alignment layer formed on the electrode layer, and a reactive liquid crystal layer formed on the first alignment layer. Hereinafter, each configuration of such a reactive liquid crystal side substrate will be explained.

(i) UV Curable Liquid Crystal Layer

The reactive liquid crystal layer used in the present invention is formed on the first alignment layer, with the reactive liquid crystal fixed. The reactive liquid crystal is aligned by the first alignment layer, and for example, the reactive liquid crystal layer can be formed by polymerizing the reactive liquid crystal by the ultraviolet ray irradiation, and fixing the aligned state. Accordingly, since the reactive liquid crystal layer is provided by fixing the aligned state of the reactive liquid crystal in the present invention, it can function as the alignment film for aligning the ferroelectric liquid crystal. Moreover, since the reactive liquid crystal layer is fixed, the excellent alignment stability can be provided without the alignment disturbance even in the case the temperature is raised to the phase transition point or higher, and thus it is advantageous. Furthermore, since the reactive liquid crystal has a structure relatively similar to that of the ferroelectric liquid crystal, the interaction with the ferroelectric liquid crystal is reinforced so that the ferroelectric liquid crystal alignment can be controlled more effectively than the case of using only the alignment film.

As such reactive liquid crystal, it is preferable that the reactive liquid crystal shows a nematic phase. The nematic phase can allows the alignment control relatively easily among the liquid crystal phases.

Moreover, it is preferable that the reactive liquid crystal has a polymerizable liquid crystal material. Accordingly, the aligned state of the reactive liquid crystal can be fixed. As the polymerizable liquid crystal material, any of a polymerizable liquid crystal monomer, a polymerizable liquid crystal oligomer and a polymerizable liquid crystal polymer can be used, however, in the present invention, the polymerizable liquid crystal monomer can be used preferably. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

The above-mentioned polymerizable liquid crystal monomer is not particularly limited as long as it is a liquid crystal monomer having a polymerizable functional group. For example, a monoacrylate monomer, a diacrylate monomer, or the like can be presented. Moreover, these polymerizable liquid crystal monomers may be used alone or as a mixture of two or more kinds.

As the monoacrylate monomer, for example, the compounds represented by the below-mentioned formula can be presented:

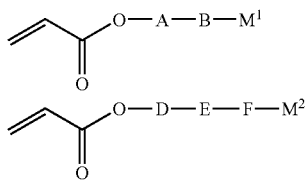

In the above-mentioned formula, A, B, D, E and F are a benzene, a cyclohexane or a pyrimidine, which may have a substituent group such as a halogen. Moreover, A and B, or D and E may be bonded via a bonding group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a spacer such as an alkylene group having 3 to 6 carbon atoms.

Moreover, as the diacrylate monomer, for example, the compounds represented by the below-mentioned formula can be presented:

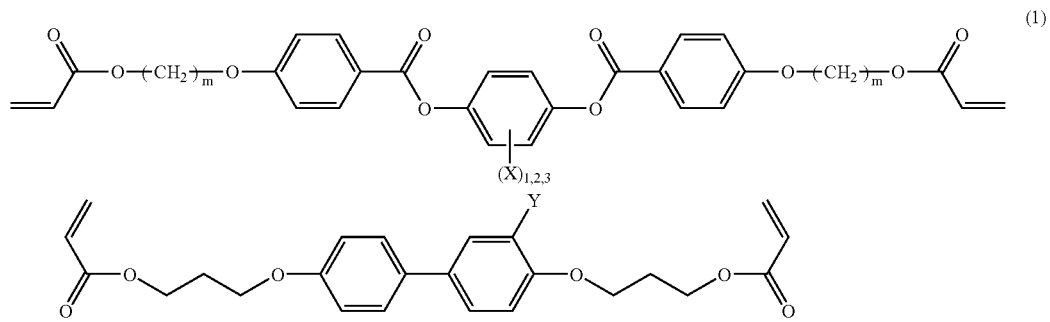

(Here, X and Y in the above formula is a hydrogen, an alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro, and m is an integer in a range of 2 to 20.)

Furthermore, as the diacrylate monomer, for example, the compounds represented by the below-mentioned formula can also be presented:

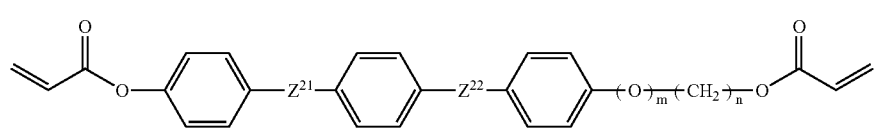

(Here, $Z^{21}$ and $Z^{22}$ in the above formula are each independently directly bonded —COO—, —OCO—, —O—, —CH$_2$CH$_2$—, —CH═CH—, —C≡C—, —OCH$_2$—, —CH$_2$O—, —CH$_2$CH$_2$COO— or —OCOCH$_2$CH$_2$—, m is 0 or 1, and n is an integer in a range of 2 to 8.)

In the present invention, in particular, the compounds represented by the above-mentioned formulae (1) and (2) can be used preferably. Moreover, in the case of the compounds represented by the above-mentioned formula (1), X is preferably an alkyloxy carbonyl having 1 to 20 carbon atoms, a methyl or a chlorine. In particular, it is preferably an alkyloxy carbonyl having 1 to 20 carbon atoms, and particularly preferably $CH_3(CH_2)_4OCO$.

The polymerizable liquid crystal monomer used in the present invention is preferably a diacrylate monomer among the above-mentioned examples. According to the diacrylate monomer, polymerization can be carried out easily while preferably maintaining the aligned state.

The above-mentioned polymerizable liquid crystal monomer may not show the nematic phase by itself. In the present invention, these polymerizable liquid crystal monomers may be used as a mixture of two or more kinds as mentioned above so that a composition mixture thereof, that is, a reactive liquid crystal may show the nematic phase.

Furthermore, according to the present invention, as needed, a photo polymerization initiating agent or a polymerization inhibiting agent may be added to the above-mentioned reactive liquid crystal. For example, at the time of polymerizing a polymerizable liquid crystal material by the electron beam irradiation, the photo polymerization initiating agent may not be needed, however, in the case of the polymerization used commonly by for example, the ultraviolet ray irradiation, in general a photo polymerization initiating agent is used for the promoting the polymerization.

As the photo polymerization initiating agent to be used in the present invention, a benzyl (it is also referred to as a bibenzoyl), a benzoin isobutyl ether, a benzoin isopropyl ether, a benzophenone, a benzoyl benzoic acid, a methyl benzoyl benzoate, a 4-benzoyl-4'-methyl diphenyl sulfide, a benzyl methyl ketal, a dimethyl amino methyl benzoate, a 2-n-butoxy ethyl-4-dimethyl amino benzoate, a p-dimethyl amino isoamyl benzoate, a 3,3'-dimethyl-4-methoxybenzophenone, a methylobenzoyl formate, a 2-methyl-1-(4-(methyl thio) phenyl)-2-morpholino propane-1-on, a 2-benzyl-2-dimethyl amino-1-(4-morpholino phenyl)-butane-1-on, a 1-(4-dodecyl phenyl)-2-hydroxy-2-methyl propane-1-on, a 1-hydroxy cyclohexyl phenyl ketone, a 2-hydroxy-2-methyl- 1-phenyl propane-1-on, a 1-(4-isopropyl phenyl)-2-hydroxy-2-methyl propane-1-on, a 2-chloro thioxantone, a 2,4-diethyl thioxantone, a 2,4-diisopropyl thioxantone, a 2,4-dimethyl thioxantone, an isopropylthioxantone, a 1-chloro-4-propoxythioxantone, or the like can be presented. In addition to the photo polymerization initiating agent, a sensitizing agent may be added within a range of not deteriorating the object of the present invention.

The addition amount of such a photo polymerization initiating agent is in general 0.01 to 20% by weight, it is preferably 0.1 to 10% by weight, and more preferably in a range of 0.5 to 5% by weight so as to be added to the above-mentioned reactive liquid crystal.

The thickness of the reactive liquid crystal layer produced by fixing the reactive liquid crystal as mentioned above is preferably in a range of 1 to 1,000 nm, and it is more preferably in a range of 10 to 200 nm. In the case the reactive liquid crystal layer is thicker than the above-mentioned range, the anisotropy is generated excessively, and in the case it is thinner than the above-mentioned range, the predetermined anisotropy may not be obtained. Therefore, the thickness of the reactive liquid crystal layer may be determined based on the needed anisotropy.

Next, the method for forming the reactive liquid crystal layer will be explained. The reactive liquid crystal layer can be formed by coating a reactive liquid crystal layer coating solution including the above-mentioned reactive liquid crystal onto the first alignment layer and applying the alignment process so as to fix the aligned state of the above-mentioned reactive liquid crystal.

Moreover, a method of preliminarily forming a dry film, or the like and laminating the same onto the first alignment layer can also be used instead of coating the reactive liquid crystal layer coating solution, however, in the present invention, it is preferable to use the method of preparing a reactive liquid crystal coating solution by dissolving a reactive liquid crystal in a solvent, coating the same on the first alignment layer and removing the solvent because this is a method relatively simple in terms of the process.

The solvent used for the above-mentioned reactive liquid crystal layer coating solution is not particularly limited as long as it can dissolve the above-mentioned reactive liquid crystal, or the like without inhibiting the alignment ability of the first alignment layer. For example, one kind or tow or more kinds of hydrocarbons such as a benzene, a toluene, a xylene, an n-butyl benzene, a diethyl benzene and a tetralin; ethers such as a methoxy benzene, a 1,2-dimethoxy benzene and a diethylene glycol dimethyl ether; ketones such as an acetone, a methyl ethyl ketone, a methyl isobutyl ketone, a cyclohexanone and a 2,4-pentane dion; esters such as an ethyl acetate, a propylene glycol mononethyl ether acetate, a propylene glycol monoethyl ether acetate and a γ-butyrolactone; amide based solvents such as a 2-pyrolidone, an N-methyl-2-pyrolidone, a dimethyl formamide and a dimethyl acetamide; alcohols such as at-butyl alcohol, a diacetone alcohol, a glycerol, a monoacetin, an ethylene glycol, a triethylene glycol and a hexylene glycol; phenols such as a phenol and a parachloro phenol; cellosolves such as a methyl cellosolve, an ethyl cellosolve, a butyl cellosolve and an ethylene glycol monomethyl ether acetate can be used.

Moreover, by using only one kind of a solvent, the solubility of the above-mentioned reactive liquid crystal, or the like may be insufficient or the first alignment layer may be corroded as mentioned above. However, by using two or more kinds of the solvents as a mixture, the trouble can be avoided. Among the above-mentioned solvents, those preferable as a single solvent are the hydrocarbons and the glycol monoether acetate based solvents, and those preferable as a solvent mixture are a mixture of the ethers or the ketones and the glycol based solvents. Since the concentration of the reactive liquid crystal layer coating solution depends on the solubility of the reactive liquid crystal and the thickness of the reactive liquid crystal layer to be formed, it cannot be defined on the whole, however, it is prepared in general in a range of 1 to 60% by weight, and preferably in a range of 3 to 40% by weight.

Furthermore, to the above-mentioned reactive liquid crystal layer coating solution, the compounds as mentioned below can be added within a range of not deteriorating the purpose of the present invention. As the compounds to be added, for example, polyester (meth)acrylates obtained by reacting a polyester prepolymer obtained by the condensation of a polyhydric alcohol and a monobasic acid or a polybasic acid with a (meth) acrylic acid; polyurethane (meth)acrylates obtained by reacting a polyol group and a compound having two isocyanate groups with each other, and reacting the reaction product with a (meth)acrylic acid; photo polymerizable compounds such as an epoxy (meth)acrylate, obtained by reacting epoxy resins such as a bisphenol A type epoxy resin, a bisphenol F type epoxy resin, a novolak type epoxy resin, a polycarboxylic acid polyglycidyl ester, a polyol polyglycidyl ether, an aliphatic or alicyclic epoxy resin, an amine epoxy resin, a triphenol methane type epoxy resin and a dihydroxy benzene type epoxy resin with a (meth)acrylic acid; photo polymerizable liquid crystal compounds having an acrylic group or a methacrylic group, or the like can be presented. The addition amount of these compounds to the above-mentioned reactive liquid crystal can be selected within a range of not deteriorating the purpose of the present invention. By adding these compounds, the hardening property of the reactive liquid crystal can be improved so that the mechanical strength of the reactive liquid crystal layer to be obtained can be increased and furthermore, the stability thereof can be improved.

AS a method for coating such a reactive liquid crystal layer coating solution, a spin coating method, a roll coating method, a printing method, a dip coating method, a curtain coating method (die coating method), a casting method, a bar coating method, a blade coating method, a spray coating method, a gravure coating method, a reverse coating method, a extruding coating method, or the like can be presented.

Moreover, after coating the above-mentioned reactive liquid crystal layer coating solution, the solvent is removed, and the solvent removal can be carried out by the reduced pressure removal or the heating removal, of furthermore, a method as a combination thereof, or the like.

According to the present invention, as mentioned above, the coated reactive liquid crystal is aligned by the first alignment layer so as to be in a state having the liquid crystal regularity. That is, the reactive liquid crystal comes to have the nematic phase. This is carried out in general by a method of the heat treatment to the N-I transition point or lower, or the like. Here, the "N-I transition point" denotes the temperature of the transition from the liquid crystal phase to the isotropic phase.

As mentioned above, the reactive liquid crystal has a polymerizable liquid crystal material. In order to fix the aligned state of such a polymerizable liquid crystal material, a method of directing an activating radiation for activating the polymerization is used. The "activating radiation" here is the radiation having the ability of inducing the polymerization to the polymerizable liquid crystal material. As needed, a photo polymerization initiating agent may be included in the polymerizable liquid crystal material.

The activating radiation is not particularly limited as long as it is a radiation capable of polymerizing the polymerizable liquid crystal material. In general, from the viewpoint of the device easiness, or the like, an ultraviolet ray or a visible light beam is used. An irradiation beam having a wavelength of 150 to 500 nm, preferably 250 to 450 nm, further preferably 300 to 400 nm is used.

According to the present invention, a method of directing an ultraviolet ray as the activating radiation to a polymerizable liquid crystal material to have the radical polymerization by generating a radical by the photo polymerization initiating agent with an ultraviolet ray is a preferable method. Since the method of using an ultraviolet ray as the activating radiation is a technique already established, it can be applied easily to the present invention including the photo polymerization initiating agent.

As the light source of the irradiating light beam, a low pressure mercury lamp (a germicidal lamp, a fluorescent chemical lamp, a black light), a high pressure discharge lamp (a high pressure mercury lamp, a metal halide lamp), a short arc discharge lamp (an ultra high pressure mercury lamp, a xenon lamp, a mercury xenon lamp), or the like can be presented as the examples. In particular, use of a metal halide lamp, a xenon lamp, a high pressure mercury lamp, or the like can be recommended. Moreover, the irradiation strength is adjusted optionally according to the composition of the reactive liquid crystal and the amount of the photo polymerization initiating agent.

The irradiation of such an activating radiation can be carried out by the temperature condition to have the above-mentioned polymerizable liquid crystal in a liquid crystal phase, or at a temperature lower than the temperature to have the liquid crystal phase. The polymerizable liquid crystal material once had the liquid crystal phase would not have the sudden disturbance of the aligned state even in the case the temperature is lowered thereafter.

As a method for fixing the aligned state of the polymerizable liquid crystal material, in addition to the above-mentioned method of directing the activating radiation, a method of polymerizing the polymerizable liquid crystal material by heating can be used as well.

(ii) First Alignment Layer

Next, the first alignment layer used in the present invention will be explained. The first alignment layer used in the present invention is not particularly limited as long as it can align the above-mentioned reactive liquid crystal without posing the adverse effect at the time of fixing the aligned state of the above-mentioned reactive liquid crystal. For example, those having the rubbing process, the optical alignment process, or the like applied can be used. In the present invention, it is preferable to use a photo alignment layer with the optical alignment process applied. Since the optical alignment process is a non contact alignment process, it is effective in that the quantitative alignment process can be controlled without generation of the static electricity or the dusts.

Since the constituent materials of the photo alignment layer, the optical alignment process method, or the like are to be mentioned for the second alignment layer of the counter substrate to be described later, explanation is omitted here.

(iii) First Substrate

The first substrate used in the invention is not limited to any especial kind if the substrate can be generally used as a substrate of liquid crystal display. Preferred examples thereof include glass plates and plastic plates. The surface roughness (RSM value) of the first substrate is preferably 10 nm or less, more preferably 3 nm or less, even more preferably 1 nm or less. The surface roughness in the invention can be measured with an atomic force microscope (AFM).

(iv) Electrode Layer

The electrode layer used in the invention are not limited to any especial kind if the electrode layer are electrode layer which are generally used as electrode layer of liquid crystal display. At least one of the electrode layers is preferably an electrode layer made of a transparent conductor. Preferred examples of the material of the transparent conductor include such as indium oxide, tin oxide, and indium tin oxide (ITO). In particular, in the case of rendering the liquid crystal display of the invention liquid crystal display of an active matrix system using TFT elements, one of the first and the second electrode layers is rendered a full-face common electrode made of the transparent conductor and the other is rendered an electrode in which x electrodes and y electrodes are arranged in a matrix form and a TFT element and a pixel electrode are arranged in a region surrounded by each of the x electrodes and each of the y electrodes. In this case, the difference between concave and convex portions of an electrode layer made of the pixel electrodes, the TFT elements, the x electrodes and the y electrodes is preferably 0.2 µm or less. If the difference between the concave and convex portions of the electrode layer is more than 0.2 µm, alignment disturbance is easily generated.

About the above-mentioned electrode layer, a transparent electroconductive film can be formed on the above-mentioned substrate by a vapor deposition method such as CVD, sputtering, or ion plating, and then this is patterned into a matrix form, whereby the x electrodes and the y electrodes can be obtained.

(2) Counter Substrate

Next, the Counter substrate used in the present invention will be explained. The counter substrate in the present invention comprises a second substrate, an electrode layer formed on the second substrate, and a second alignment layer formed on the electrode layer. Hereinafter, the respective configurations of the counter substrate will be explained. As to the second substrate, those explained for the first substrate of the above-mentioned reactive liquid crystal side substrate, and as to the electrode layer, those explained for the electrode layer of the above-mentioned reactive liquid crystal side substrate can be used, explanation is omitted here.

(i) Second Alignment Layer

The second alignment layer used in the present invention is not particularly limited as long as it can align the ferroelectric liquid crystal. As such a second alignment layer, for example, those having the rubbing process, the optical alignment process, or the like applied can be used. In the present invention, it is preferable to use a photo alignment layer with the optical alignment process applied. Since the optical alignment process is a non contact alignment process, it is effective in that the quantitative alignment process can be controlled without generation of the static electricity or the dusts. Hereinafter, such a photo alignment layer will be explained.

(Photo Alignment Layer)

The photo alignment layer has the liquid crystal molecule on the film aligned by providing the anisotropy to a film obtained by directing a light beam with the polarization controlled to a substrate coated with the constituent materials of the photo alignment layer to be described later so as to generate the photo excitation reaction (decomposition, isomerization, dimerization).

The constituent material for the photo alignment layer used in the present invention is not particularly limited as long as it has the effect of aligning the ferroelectric liquid crystal by generating the photo excitation reaction by directing a light beam (photo aligning). Such materials can be roughly classified into the photoreactive materials for providing the anisotropy to the photo alignment layer by generating the photoreaction and the photo isomerizable materials for providing the anisotropy to the photo alignment layer by generating the photo isomerization reaction. The wavelength range of light which causes photo-excited reaction in the constituent materials of the photo alignment layers is preferably within the wavelength range of ultraviolet rays, that is, the range of 10 to 400 nm, more preferably within the range of 250 to 380 nm. Hereinafter, each of the photoreaction type and the photo isomerization type will be explained.

(Photoreaction Type)

First, the photoreaction type constituent materials will be explained. As mentioned above, the photoreaction type constituent material is a material for providing the anisotropy to the photo alignment layer by generating the photo reaction. The photoreactive type constituent materials used in the present invention are not particularly limited as long as they have such a characteristic. Among them, a material for providing the anisotropy to the above-mentioned photo alignment layer by generating the photo dimerization reaction or the photo decomposition reaction is preferable.

The photo dimerization reaction is a reaction that two molecules are polymerized by radical polymerization of their reactive sites aligned in the direction of polarization through the light irradiation. This reaction makes it possible to stabilize the alignment in the polarization direction to give anisotropy to the photo alignment layer. On the other hand, the photo decompostion reaction is a reaction which decomposes a molecule chain of polyimide or the like which is aligned in the direction of polarization by the light irradiation. This reaction makes it possible to give anisotropy to the photo alignment layer in the state that the molecule chain aligned in the direction perpendicular to the polarization direction remains. It is more preferable in the invention to use, out of these photoreactive materials, materials which give anisotropy to the photo alignment layer by the photo dimerization reaction since the materials are high in exposure sensitivity and the scope of material-selection is wide.

The photoreactive material using the photo dimerization reaction is not limited to any especial kind if the material can give anisotropy to the photo alignment layer by photo dimerization reaction. The material preferably comprises a photo dimerization-reactive compound having a radical-polymerizable functional group and a dichroism having different absorptions according to the polarization direction thereof since the alignment of the photo dimerization-reactive compound is stabilized and anisotropy can easily be given to the photo alignment layer by radical-polymerizing its reactive sites aligned in the polarization direction.

Examples of the photo dimerization-reactive compound having such properties include dimerization-reactive polymers each having, as its side chain, at least one reactive site selected from a cinnamic acid ester, a coumalin, a quinoline, a chalcone group and a cinnamoyl group.

Of these, the following is preferred as the photo dimerization-reactive compound having such properties: a dimerization-reactive polymer having, as its side chain, any one of a cinnamic acid ester, a coumalin and a quinoline. This is because the compound is radical-polymerized in the state that the double bonds in the α,β-unsaturated ketone aligned in the polarization direction function as reactive sites, whereby anisotropy can easily be given to the photo alignment layer.

The main chain of the dimerization-reactive polymer is not limited to any especial kind if the main chair is a chain that is generally known as a polymer main chain, and is preferably a chain which does not have a substituent containing many π electrons, which hinder interactions between the reactive sites of the above-mentioned side chain, an example of the substituent being an aromatic hydrocarbon group.

The weight-average molecular weight of the dimerization-reactive polymer is not especially limited, and is preferably from 5,000 to 40,000, more preferably from 10,000 to 20,000.

The weight-average molecular weight can be measured by gel permeation chromatography (GPC). If the weight-average molecular weight of the dimerization-reactive polymer is too small, an appropriate anisotropy may not be given to the photo alignment layer. Conversely, if it is too large, the viscosity of the coating solution at the time of the formation of the photo alignment layer is so high that a homogeneous coat film may not easily be formed.

As the dimerization-reactive polymer, a compound represented by the following formula can be illustrated:

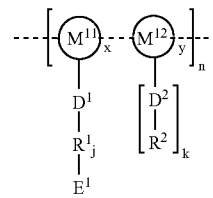

In the formula, $M^{11}$ and $M^{12}$ each independently represent a monomer unit of a homopolymer or a copolymer. Examples thereof include ethylene, acrylate, methacrylate, 2-chloroacrylate, acrylamide, methacrylamide, 2-chloroacrylamide, styrene derivatives, maleic acid derivatives, and siloxane. $M^{12}$ may be acrylonitrile, methacrylonitrile, methacrylate, methyl methacrylate, hydroxyalkyl acrylate or hydroxyalkyl methacrylate. x and v each represent the mole ratio of each of the monomer units when the units are polymerized into a copolymer, and are each a number satisfying: $0<x\leq 1$, $0\leq y<1$, and $x+y=1$. n represents an integer of 4 to 30,000. $D^1$ and $D^2$ each represent a spacer unit.

$R^1$ is a group represented by $-A^1-(Z^1-B^1)_z-Z^2-$, and $B^2$ is a group represented by $-A^1-(Z^1-B^1)_2-Z^3-$, wherein $A^1$ and $B^1$ each independently represent a covalent single bond, pyridine-2,5-diyl, pyrimidine-2,5-diyl, 1,4-cyclohexylene, 1,3-dioxane-2,5-diyl, or 1,4-phenylene which may have a substituent; $Z^1$ and $Z^2$ each independently represent a covalent single bond, $-CH_2-CH_2-$, $-CH_2O-$, $-OCH_2-$, $-CONR-$, $-RNCO-$, $-COO-$ or $-OOC-$, wherein R is a hydrogen atom or a lower alkyl group; $Z^3$ is a hydrogen atom, an alkyl or alkoxy which has 1 to 12 carbon atoms and may have a substituent, cyano, nitro or halogen; z is an integer of 0 to 4; $E^1$ represents an optically dimerization-reactive site, examples of which include a cinnamic acid ester, a coumalin, a quinoline, a chalcone group and a cinnamoyl group; and j and k are each independently 0 or 1.

More preferable examples of this dimerization-reactive polymer include compounds represented by the following formulae:

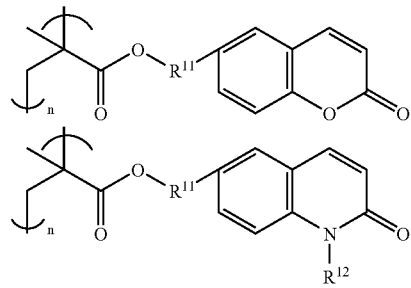

-continued

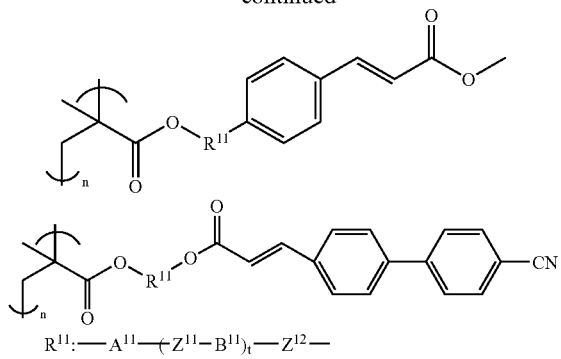

$R^{11}$:—$A^{11}$—$(Z^{11}$—$B^{11})_t$—$Z^{12}$— wherein $A^{11}$ and $B^{11}$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —$CH_2$—$CH_2$—, —COO—, —OOC—, or a covalent single bond; and t: an integer of 0 to 4.

$R^{12}$: a lower alkyl n: an integer of 4 to 30,000

Of the above-mentioned dimerization-reactive polymers, particularly preferable is at least one of compounds 1 to 4 represented by the following formulae:

of the photo dimerization-reactive compound may be used alone or a combination of two or more kinds thereof can be used.

The photoreactive material using photo dimerization reaction may contain additives besides the above-mentioned photo dimerization-reactive compound as long as the photo-aligning of the photo alignment layer is not hindered. Examples of the additives include a polymerization initiator and a polymerization inhibitor.

It is advisable to select the polymerization initiator or the polymerization inhibitor appropriately from generally-known compounds in accordance with the kind of the photo dimerization-reactive compound and then use the selected one. The added amount of the polymerization initiator or the polymerization inhibitor is preferably from 0.001 to 20% by weight, more preferably from 0.1 to 5% by weight of the photo dimerization-reactive compound. If the added amount of the polymerization initiator or the polymerization inhibitor is too small, the polymerization may not be initiated (or inhibited). Conversely, if the amount is too large, the reaction may be hindered.

Examples of the photoreactive material using the photo decompostion reaction include a polyimide "RN 1199" manufactured by NISSAN CHEMICAL INDUSTRIES, LTD.

Next, the optical alignment process method in the case of using the above-mentioned photoreactive type material will be explained. In the present invention, the optical alignment

1

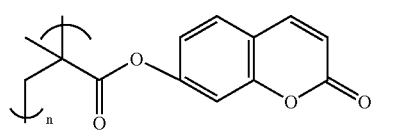

2

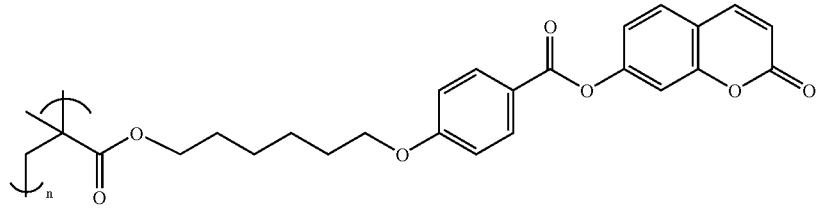

3

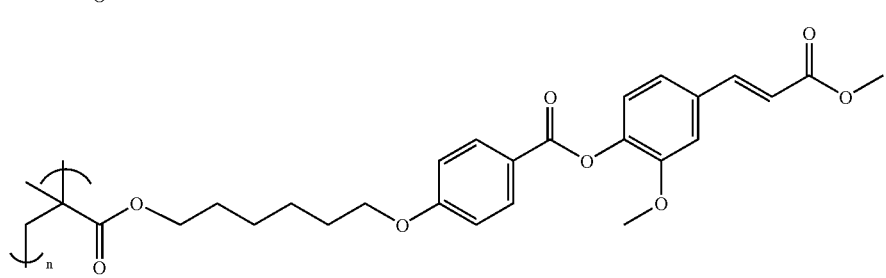

4

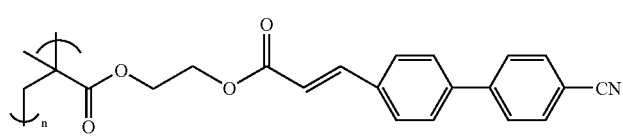

In the present invention, an optically dimerization-reactive site or substituent can be variously selected as the photo dimerization-reactive compound from the above-mentioned compounds in accordance with required properties. One kind process method is not particularly limited as long as it can provide the anisotropy to the photo alignment layer. For example, it can be carried out by coating a coating solution prepared by diluting the constituent materials of the above-mentioned photo alignment layer with an organic solvent onto the surface facing the liquid crystal layer of the substrate provided with the electrode layer, and drying. In this case, the content of the photo dimerization reactive compound in the coating solution is preferably in a range of 0.05 to 10% by weight, and it is more preferably in a range of 0.2 to 2% by weight. In the case the content of the photo dimerization reactive compound is too small, it is difficult to provide the appropriate anisotropy to the alignment film. On the contrary, in the case it is too large, a homogeneous coating film can hardly be formed due to the high viscosity of the coating solution.

The coating method which can be used is spin coating, roll coating, rod bar coating, spray coating, air knife coating, slot die coating, wire bar coating or the like.

The thickness of the polymer film obtained by the coating with the constituent material is preferably from 1 to 200 nm, more preferably from 3 to 100 nm. If the thickness of the polymer film is too small, a sufficient photo aligning may not be obtained. Conversely, if the thickness is too large, the alignment of the liquid crystal molecules may be disturbed and further costs therefore are not preferred.

The resultant polymer film causes photo-excited reaction by the light irradiation the polarization of which is controlled, whereby anisotropy can be given. The wavelength range of the radiated light should be appropriately selected in accordance with the constituent material of the used photo alignment layer, and is preferably the range of ultraviolet ray wavelengths, that is, the range of 100 to 400 nm, more preferably the range of 250 to 380 nm.

The direction of the polarization is note specially limited if the direction makes it possible to generate the photo-excited reaction, and is preferably in the range of 0 to 45° oblique to the substrate face, more preferably in the range of 20 to 45° oblique thereto since the aligned state of the ferroelectric liquid crystal can be made good.

(Photo Isomerization Type)

Next, the photo isomerization type materials will be explained. The photo isomerization type materials here are a material for providing the anisotropy to the photo alignment layer by generating the photo isomerization reaction as mentioned above. It is not particularly limited as long as it is a material having such a characteristic. Those including the photo isomerization-reactive compound for providing the anisotropy to the above-mentioned photo alignment layer by generating the photo isomerization reaction are preferable. Since such a photo isomerization-reactive compound is included, stable isomers are increased out of a plurality of isomers by the light irradiation, and thereby the anisotropy can be provided easily to the photo alignment layer.

The photo isomerization-reactive compound is not limited to any especial kind if the compound is a material having such properties mentioned above, and is preferably a compound which has a dichroism having different absorptions according to the polarization direction thereof and generates photo isomerization reaction by the light irradiation. By generating the isomerization of the reactive site aligned in the polarization direction of the photo isomerization-reactive compound having such properties, anisotropy can easily be given to the photo alignment layer.

For the photo isomerization reaction generated by the photo isomerization-reactive compound is preferably the cis-trans isomerization reaction since any one of the cis-isomer and the trans-isomer increases by the light irradiation, whereby anisotropy can be given to the photo alignment layer.

Examples of the photo isomerization-reactive compound used in the invention may be monomolecular compounds or polymerizable monomers polymerizable with light or heat. These should be appropriately selected in accordance with the kind of the used ferroelectric liquid crystal. It is preferable to use any one of the polymerizable monomers since the monomer gives anisotropy to the photo alignment layer by the light irradiation and subsequently the monomer is polymerized, whereby the anisotropy can be made stable. Of such polymerizable monomers, preferable is an acrylate monomer or methacrylate monomer since the monomer gives anisotropy to the photo alignment layer and subsequently the monomer can easily be polymerized in the state that the anisotropy is kept good.

The polymerizable monomer may be a monofunctional monomer or a polyfunctional monomer. A bifunctional monomer is preferable since the anisotropy of the photo alignment layer, based on the polymerization, becomes more stable.

Specific examples of such a photo isomerization-reactive compound include compounds having a cis-trans isomerization-reactive skeleton, such as an azobenzene skeleton or a stilbene skeleton.

In this case, the number of the cis-trans isomerization-reactive skeleton(s) may be one or more, and is preferably two since the alignment of the ferroelectric liquid crystal is easily controlled.

The cis-trans isomerization-reactive skeleton(s) may have a substituent in order to make interaction thereof with the liquid crystal molecules higher. The substituent is not limited to any especial kind if the substituent can make the interaction with the liquid crystal molecules high and further does not hinder the alignment of the cis-trans isomerization-reactive skeleton(s). Examples thereof include a carboxyl group, a sodium sulfonate group, and a hydroxyl group. These skeleton structures can be appropriately selected in accordance with the kind of the used ferroelectric liquid crystal.

The photo isomerization-reactive compound may have a group containing many $\pi$ electrons in the molecule, such as an aromatic hydrocarbon group, besides the cis-trans isomerization-reactive skeleton in order to make the interaction with the liquid crystal molecules higher. The cis-trans isomerization-reactive skeleton and the aromatic hydrocarbon group may be bonded to each other through a bonding group. The bonding group is not limited to any especial kind if the group can make the interaction with the liquid crystal molecules high. Examples thereof include —COO—, —OCO—, —O—, —C≡C—, —CH$_2$—CH$_2$—, —CH$_2$O—, and —OCH$_2$—.

In the case of using a polymerizable monomer as the photo isomerization-reactive compound, it is preferable that the monomer has, as its side chain, the above-mentioned cis-trans isomerization-reactive skeleton. When the monomer has, as its side chain, the cis-trans isomerization-reactive skeleton, the advantageous effect of the anisotropy given to the photo alignment layer becomes larger and this compound becomes particularly suitable for the control of the alignment of the ferroelectric liquid crystal. In this case, it is preferable that the above-mentioned aromatic hydrocarbon group and the bording group contained in the molecule are contained, together with the cis-trans isomerization-reactive skeleton, in the side chain so as to make the interaction with the liquid crystal molecules high.

The side chain of the polymerizable monomer may have, as a spacer, an aliphatic hydrocarbon group such as an alkylene group so that the cis-trans isomerization-reactive skeleton can easily be aligned.

Of the above-mentioned photo isomerization-reactive compounds of monomolecular compounds and polymerizable monomers as described above, any compound having in the molecule thereof an azobenzene skeleton is preferable as the photo isomerization-reactive compound used in the present invention. This is because the azobenzene skeleton interacts highly with the liquid crystal molecules and is particularly suitable for the control of the alignment of the ferroelectric liquid crystal since the skeleton contains many π electrons.

Hereinafter, the reason why the anisotropy can be provided to the photo alignment layer by generating the photo isomerization reaction by the azobenzene skeleton will be explained. First, when the azobenzene skeleton is irradiated with linearly polarized ultraviolet rays, the azobenzene skeleton of a trans isomer, as shown in the below formula, in which its molecule long axis is aligned in the polarization direction, is changed to the cis isomer thereof.

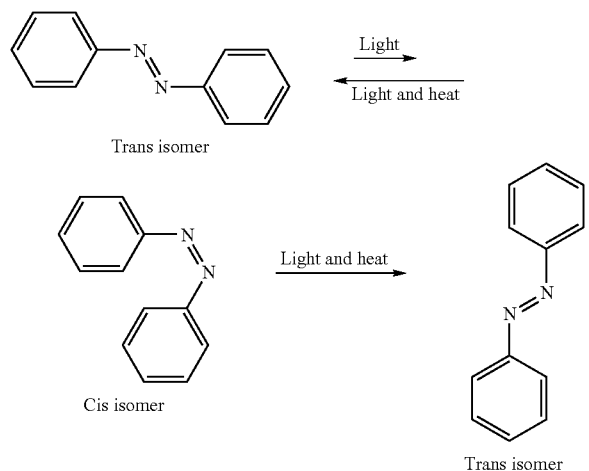

Since the cis isomer of the azobenzene skeleton is more chemically unstable than trans isomers thereof, the cis isomer returns thermally to any one of the trans isomers or absorbs visible rays to returns thereto. At this time, it happens with the same possibility whether the cis isomer turns to the trans isomer at the left side or the trans isomer at the right side in above formula. Accordingly, when the azobenzene skeleton continues to absorb ultraviolet rays, the ratio of the trans isomer at the right side increases so that the average alignment direction of the azobenzene skeleton becomes perpendicular to the polarized ultraviolet ray direction. In the present invention, this phenomenon is used to make polarization directions of skeletons of azobenzene consistent with each other, thereby giving anisotropy to the photo alignment layer to control the alignment of liquid crystal molecules on the film.

An example of a monomolecular compound out of the compounds each having in the molecule thereof an azobenzene skeleton may be a compound represented by the following formula:

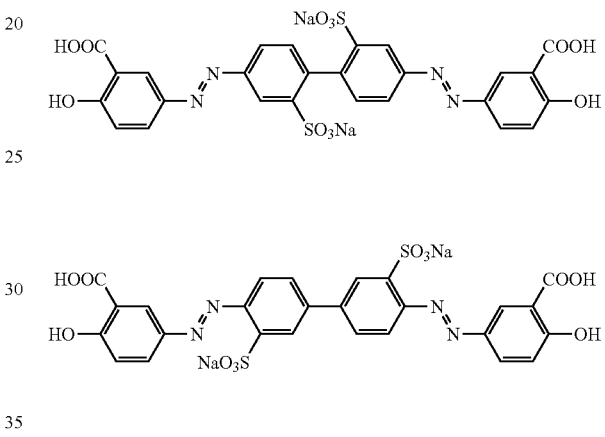

An example of the polymerizable monomer having in its side chain the azobenzene skeleton may be a compound represented by the following formulae:

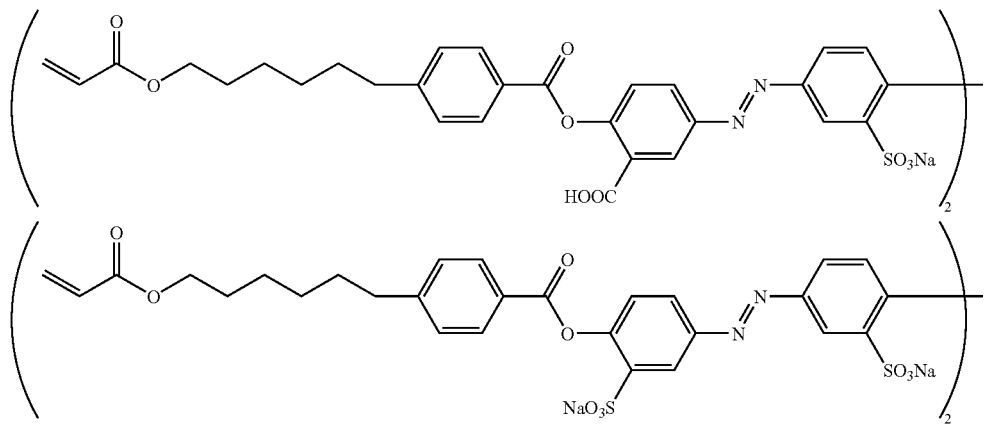

In the present invention, the cis-trans isomerization-reactive skeleton or substituent can be variously selected from the photo isomerization-reactive compounds in accordance with required properties. One kind of the photo isomerization-reactive compound may be used alone or a combination of two or more kinds thereof can be used.

Additives, besides the above-mentioned photo isomerization-reactive compound, may be contained as the photo isomerization type material used in the present invention as long as the photoaligning of the photo alignment layer is not hindered. In the case of using a polymerizable monomer as the photo isomerization-reactive compound, examples of the additives include a polymerization initiator and a polymerization inhibitor.

It is advisable to select the polymerization initiator or the polymerization inhibitor appropriately from generally-known compounds in accordance with the kind of the photo isomerization-reactive compound and then use the selected one. The added amount of the polymerization initiator or the polymerization inhibitor is preferably from 0.001 to 20% by weight, more preferably from 0.1 to 5% by weight of the photo isomerization-reactive compound. If the added amount of the polymerization initiator or the polymerization inhibitor is too small, the polymerization may not be initiated (or inhibited). Conversely, if the amount is too large, the reaction may be hindered.

The optical alignment process n the case of using such a photo isomerization type material can be carried out by the same method as in the case of using the above-mentioned photoreactive materials. In this case, the content of the photo isomerization-reactive compound in the coating solution is preferably in a range of 0.05 to 10% by weight, and it is more preferably in a range of 0.2 to 5% by weight. Moreover, in the case of the photo isomerization type, the optical alignment process can be carried out also by directing a non polarized ultraviolet ray irradiation. The direction of the light beam is not particularly limited as long as the above-mentioned photo excitation reaction can be generated, however, since the aligned state of the ferroelectric liquid crystal can be made preferable, it is preferably obliquely in a range of 10 to 45° with respect to the substrate surface, and it is more preferably in a range of 30 to 45°. Furthermore, in the case the above-mentioned polymerizable monomer is used as the photo isomerization-reactive compound, by heating after the optical alignment process, it can be processed to be a polymer so that the anisotropy provided to the photo alignment layer can be stabilized.

(ii) Second UV Curable Liquid Crystal Layer

According to the present invention, a second reactive liquid crystal layer provided by fixing a reactive liquid crystal may be formed on the above-mentioned second alignment layer. In this case, it is preferable that the reactive liquid crystal comprising the reactive liquid crystal layer of the above-mentioned reactive liquid crystal side substrate has a composition different from that of the reactive liquid crystal comprising the second reactive liquid crystal layer of the counter substrate. Since the second reactive liquid crystal layer provided by fixing the reactive liquid crystal is formed also on the counter surface of the second alignment layer, the above-mentioned effect to be obtained by forming the reactive liquid crystal layer can further be improved, and thus the alignment of the ferroelectric liquid crystal can be controlled further effectively. Moreover, since the reactive liquid crystal comprising the above-mentioned reactive liquid crystal layer and the reactive liquid crystal comprising the above-mentioned second reactive liquid crystal have different compositions, generation of the alignment defects such as the zigzag defect and the hairpin defect can be restrained and the mono-domain alignment of the ferroelectric liquid crystal can be obtained.

The reactive liquid crystal used in the second reactive liquid crystal layer, the method for forming the second reactive liquid crystal layer, or the like are same as those mentioned in the above-mentioned column of the "(1) reactive liquid crystal side substrate (i) reactive liquid crystal layer".

According to the present invention, by variously selecting the polymerizable functional group and the substituent group of the above-mentioned polymerizable monomer, the compositions of the reactive liquid crystal comprising the above-mentioned reactive liquid crystal layer and the reactive liquid crystal comprising the above-mentioned second reactive liquid crystal layer can be made different. In this case, the polymerizable functional groups of the polymerizable monomers used for the above-mentioned two reactive liquid crystals may either be same or different. Moreover, according to the present invention, two or more kinds of the polymerizable monomers may be used in a combination, and by changing the combination, the composition can be varied. Furthermore, even in the case of using the same combination, by changing the content of the polymerizable monomer, respectively, composition can be made different.

(3) Liquid Crystal Layer

Next, the liquid crystal layer will be explained. The liquid crystal layer used in the present invention is produced by sandwiching the ferroelectric liquid crystal between the above-mentioned reactive liquid crystal side substrate and the above-mentioned counter substrate.

(Ferroelectric Liquid Crystal)

The ferroelectric liquid crystal used in the present invention is a material showing the SmC* phase via the SmA phase in the temperature lowering process, and showing the mono-stability in the SmC* phase. The phase sequence of the ferroelectric liquid crystal is not particularly limited as long as it shows the SmC* phase via the SmA phase in the temperature lowering process, and it may show another liquid crystal phase on the high temperature side or the low temperature side of the liquid crystal phases. Among these, for the wide material selection range, it is preferable to use a material showing the SmC* phase from the Ch phase via the SmA phase. Such a ferroelectric liquid crystal can be selected variously from the commonly known materials according to the demanded characteristics.

Moreover, as such a ferroelectric liquid crystal, although a single material showing the SmC* phase can be used, a material showing the above-mentioned phase sequence by adding a small amount of a optically active substance not showing the SmC phase itself but capable of inducing the spontaneous polarization and an appropriate spiral pitch to a low viscosity non-chiral liquid crystal easily showing the SmC phase (hereinafter, it may be referred to as the host liquid crystal) is preferable for its low viscosity and capability of realizing a higher response.

As the host liquid crystal mentioned above, a material showing the SmC phase in a wide temperature range is preferable. Those commonly known as a host liquid crystal for a ferroelectric liquid crystal can be used without limitation particularly. For example, a compound represented by the below-mentioned general formula:

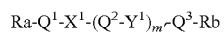

$$Ra\text{-}Q^1\text{-}X^1\text{-}(Q^2\text{-}Y^1)_m\text{-}Q^3\text{-}Rb$$

(in the formula, Ra and Rb are each a straight chain or branched alkyl group, an alkoxy group, an alkoxy carbonyl group, an alkanoyloxy group or an alkoxy carbonyloxy group, $Q^1$, $Q^2$ and $Q^3$ are each a 1,4-phenylene group, a 1,4-cyclohexylene group, a pyridine-2,5-diyl group, a pyradine-2,5-diyl group, a pyridazine-3,6-diyl group or a 1,3-dioxane-2,5-diyl group, wherein these groups may have a substituent group such as a halogen atom, a hydroxyl group and a cyano group, $X^1$ and $Y^1$ are each —COO—, —OCO—, —CH$_2$O—, —OCH$_2$—, —CH$_2$CH$_2$—, —C≡C— or a single bond, and m' is 0 or 1) can be used. As the host liquid crystal, the above-mentioned compounds can be used either alone by one kind or as a combination of two or more kinds.

The optically active substance to be added to the above-mentioned host liquid crystal is not particularly limited as long as it is a material having the large spontaneous polarization and the ability capable of inducing an appropriate spiral pitch, and thus those commonly known as a material to be added to a liquid crystal composition showing the SmC phase can be used. In particular, a material capable of inducing the large spontaneous polarization by a small addition amount is preferable. As such an optically active substance, for example, a compound represented by the below-mentioned general formula:

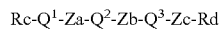

Rc-Q$^1$-Za-Q$^2$-Zb-Q$^3$-Zc-Rd (in the formula, Ra, $Q^1$, $Q^2$, $Q^3$ denote the same things as in the above-mentioned general formula, Za and Zb are —COO—, —OCO—, —CH$_2$O—, —OCH$_2$—, —CH$_2$CH$_2$—, —C≡C—, —CH=N—, —N=N—, —N(→O)=N—, —C(=O)S— or a single bond, Rc is a straight chain or branched alkyl group, which may have an asymmetric carbon atom, an alkoxy group, an alkoxy carbonyl group, an alkanoyloxy group or an alkoxy carbonyloxy group, Rd is a straight chain or branched alkyl group having an asymmetric carbon atom, an alkoxy group, an alkoxy carbonyl group, an alkanoyloxy group or an alkoxy carbonyloxy group, and Rc and Rd may be substituted with a halogen atom, a cyano group or a hydroxyl group) can be used. As the optically active substance, the above-mentioned compounds can be used either alone by one kind or as a combination of two or more kinds.

The ferroelectric liquid crystal used in the invention is preferably one constituting a single phase. The word "constituting a single phase" means that a polymer network, as formed by the polymer stabilizing method or the like, is not formed. Such use of the ferroelectric liquid crystal of a single phase produces an advantage that the production process becomes simple and the driving voltage can be made low.

As the ferroelectric liquid crystal used in the present invention, specifically, "FELIXM4851-100" produced by Clariant (Japan) K.K., or the like can be presented.

(Liquid Crystal Layer)

The thickness of the liquid crystal layer made of the ferroelectric liquid crystal is preferably from 1.2 to 3.0 μm, more preferably from 1.3 to 2.5 μm, even more preferably from 1.4 to 2.0 μm. If the thickness of the liquid crystal layer is too small, the contrast may lower. Conversely, if the thickness is too large, the liquid crystal may not be aligned with ease.

As the method for forming such liquid crystal layer, a method which is generally used as a method for forming a liquid crystal cell can be used. For example, the liquid crystal layer can be formed, by making use of capillary effect to inject an isotropic liquid obtained by heating the above-mentioned ferroelectric liquid crystal into a liquid crystal cell, which is formed by forming electrode layer beforehand on a substrate and arranging the above-mentioned photo alignment layer, and then sealing the cell with an adhesive agent. The thickness of the liquid crystal layer can be adjusted with spacers such as beads.

(4) Polarizing Plate

The polarizing plate used in the invention is not limited to any especial kind if the plate is a member for transmitting only a specific direction of wave motions of light. It is possible to use a member which is generally used as a polarizing plate for liquid crystal display.

2. Process for Producing a Liquid Crystal Display

Next, the process for producing a liquid crystal display of the present invention will be explained. As the process for producing a liquid crystal display of the present invention, the methods commonly known as the process for producing a liquid crystal display can be used, and thus it is not particularly limited. Hereinafter, as an example of the process for producing a liquid crystal display of the present invention, the case of producing a liquid crystal display of the active matrix system using the TFT elements will be explained.

First, a transparent conductive film is formed by the above-mentioned deposition method on the first substrate so as to provide the entire surface common electrode. On the other hand, a X electrode, a Y electrode are formed on the second substrate by patterning the transparent conductive film in a matrix so as to provide a switching element and a pixel electrode.

Next, by coating the constituent materials each for the first alignment layer and the second alignment layer on the electrode layers formed on the first substrate and the second substrate accordingly, and as needed applying the alignment process, the first alignment layer and the second alignment layer are formed. Furthermore, by coating a reactive liquid crystal including a polymerizable liquid crystal material, showing the nematic phase on the first alignment layer, and fixing the same by the ultraviolet ray, or the like, the reactive liquid crystal layer is formed.

On the surface of either of the reactive liquid crystal layer or the second alignment layer formed accordingly, with beads dispersed as a spacer and the sealing agent coated on the circumference, the reactive liquid crystal side substrate and the counter substrate are attached and thermally pressed such that the reactive liquid crystal layer of the reactive liquid crystal side substrate and the second alignment layer of the counter substrate face with each other. After the thermal compress, capillary effect is used to inject a ferroelectric liquid crystal, in an isotropic liquid state, from an injecting port thereinto, and then the injecting port is sealed with an ultraviolet curable resin or the like. Thereafter, the ferroelectric liquid crystal is slowly cooled, whereby the liquid crystal can be aligned. Polarizing plates are stuck onto the upper and the lower of the thus-obtained liquid crystal cell, whereby liquid crystal display of the present invention can be yield.

C. Usage of a Liquid Crystal Display

The liquid crystal display of the present invention as described above is capable of realizing the mono-stability operation mode using the ferroelectric liquid crystal material showing the SmC* phase via the SmA phase in the temperature lowering process. Since the graduation display can be realized and the material selection width for the ferroelectric liquid crystal can be widened, a liquid crystal display compatible to the various demanded characteristics can be obtained. In particular, according to the liquid crystal display of the present invention, by adopting the color filter system or the field sequential color system, it is preferable as a color liquid crystal display. According to the liquid crystal display of the present invention, since the ferroelectric liquid crystal can be aligned without generating the alignment defects such as the zigzag defect and the hairpin defect, the contrast ratio deterioration by the light leakage can be prevented, and furthermore, owing to the wide view angle and the high speed response property, a highly precise color display can be realized.

In particular, it is preferable that the liquid crystal display of the present invention is driven by the field sequential color system. The field sequential color system is for enabling the color display by switching on or off the liquid crystal synchronously with flickering of the LED of the three colors of red, green and blue without the use of a color filter. Thereby, a bright, highly precise color moving image display can be realized with a low power consumption, a low cost and a wide view angle. Moreover, as the ferroelectric liquid crystal, by using a material of the half V-shaped drive with the liquid crystal molecules operated only at the time either a positive or negative voltage is applied, the light leakage at the time of the dark part operation (black and white shutter aperture closed) can be reduced so that the opening time as the black and white shutter can be made sufficiently long. Thereby, each color to be switched by a time duration can be displayed further brightly so that a bright color liquid crystal display can be obtained.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

The present invention will be described in more detail by way of the following examples. Compound A represented by the following formula was used as optically dimerization-reactive polymers and compound B represented by the following formula was used as photo isomerization-reactive compounds. Moreover, as the polymerizable liquid crystal monomer to be used for the reactive liquid crystal, a compound C, a compound D and a compound E represented by the below-mentioned formulae were used.

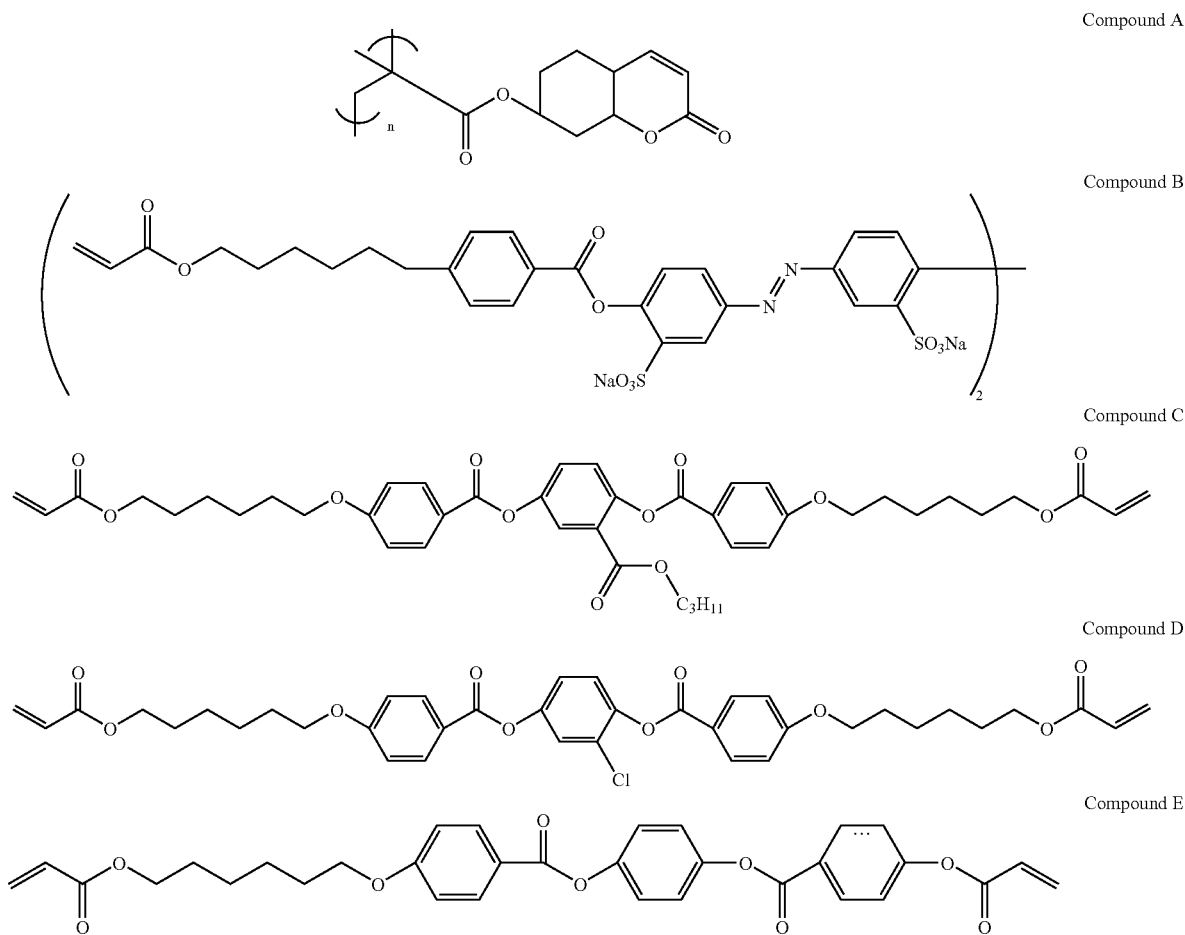

Example 1

Two glass substrates with an ITO coating were spin coated with a 2% by weight solution of a compound A dissolved in a cyclopentanone for 30 seconds by a 4,000 rpm rotational frequency. After drying for 10 minutes at 180° C. in an oven, it was exposed by 100 mJ/cm² with a polarized ultraviolet ray. Furthermore, one of the substrates was spin coated with a 2% by weight solution of a compound C dissolved in a cyclopentanone for 30 seconds by a 4,000 rpm for lamination. After drying for 3 minutes at 55° C., it was exposed at 1,000 mJ/cm² with a non polarized ultraviolet ray at 55° C. Thereafter, with a 1.5 μm spacer sprinkled on one of the glass substrates and a sealing material coated on the other substrate, the substrates were assembled in a direction parallel to the polarized ultraviolet ray irradiation direction in an anti-parallel state, and thermally pressed. As the liquid crystal, "FELIX 4851-100" (produced by Clariant (Japan) K.K.) was used. With the liquid crystal adhered on the injection opening upper part, injection was carried out at a temperature higher than the nematic phase-isotropic phase transition temperature by 10° C. to 20° C. with an oven, and then it was returned slowly to the room temperature so as to obtain a mono domain and show the mono-stability.

Comparative Example 1

Two glass substrates with an ITO coating were spin coated with a 2% by weight solution of a compound A dissolved in a cyclopentanone for 30 seconds by a 4,000 rpm rotational frequency. After drying for 10 minutes at 180° C. in an oven, it was exposed by 100 mJ/cm$^2$ with a polarized ultraviolet ray. A 1.5 µm spacer was sprinkled on one of the substrates and a sealing material was coated on the other substrate. Thereafter, the substrates were assembled in a direction parallel to the polarized ultraviolet ray irradiation direction in an anti-parallel state, and thermally pressed. Using "FELIX 4851-100" mentioned above, injection was carried out in the same manner as in the example 1, and then it was returned slowly to the room temperature so as to generate the alignment defects and show the bi-stability state.

Example 2

Two glass substrates with an ITO coating were spin coated with a 1% by weight solution of a compound B dissolved in a N-butyl-2-pyrolidinone and a 2-butoxy ethanol (50:50 w %) for 30 seconds by a 4,000 rpm rotational frequency. After drying for 1 minute at 100° C. in an oven, it was exposed by 5,000 mJ/cm$^2$ with a polarized ultraviolet ray. Furthermore, one of the substrates was spin coated with a 2% by weight solution of a compound C dissolved in a cyclopentanone for 30 seconds by a 4,000 rpm for lamination. After drying for 3 minutes at 55° C., it was exposed at 1,000 mJ/cm$^2$ with a non polarized ultraviolet ray at 55° C. Thereafter, with a 1.5 µm spacer sprinkled on one of the glass substrates and a sealing material coated on the other substrate, the substrates were assembled in a direction parallel to the polarized ultraviolet ray irradiation direction in an anti-parallel state, and thermally pressed. Using "FELIX 4851-100" mentioned above, injection was carried out in the same manner as in the example 1, and then it was returned slowly to the room temperature so as to obtain a mono domain and show the mono-stability.

Comparative Example 2

Two glass substrates with an ITO coating were spin coated with a 1% by weight solution of a compound B dissolved in a N-butyl-2-pyrolidinone and a 2-butoxy ethanol (50:50 w %) for 30 seconds by a 4,000 rpm rotational frequency. After drying for 1 minute at 100° C. in an oven, it was exposed by 5,000 mJ/cm$^2$ with a polarized ultraviolet ray. Thereafter, with a 1.5 µm spacer sprinkled on one of the glass substrates and a sealing material coated on the other substrate, the substrates were assembled in a direction parallel to the polarized ultraviolet ray irradiation direction in an anti-parallel state, and thermally pressed. Using "FELIX 4851-100" mentioned above, injection was carried out in the same manner as in the example 1, and then it was returned slowly to the room temperature so as to generate the alignment defects and show the bi-stability state.

Example 3

Two glass substrates with an ITO coating were spin coated with a 2% by weight solution of a compound A dissolved in a cyclopentanone for 30 seconds by a 4,000 rpm rotational frequency. After drying for 10 minutes at 180° C. in an oven, it was exposed by 100 mJ/cm$^2$ with a polarized ultraviolet ray. Furthermore, one of the substrates was spin coated with a 2% by weight solution of a compound C dissolved in a cyclopentanone, and the other substrate was spin coated with a 2% by weight solution of a compound D dissolved in a cyclopentanone each for 30 seconds by a 4,000 rpm for lamination. After drying for 3 minutes at 55° C., they were exposed at 1,000 mJ/cm$^2$ with a non polarized ultraviolet ray at 55° C. Thereafter, with a 1.5 µm spacer sprinkled on one of the glass substrates and a sealing material coated on the other substrate, the substrates were assembled in a direction parallel to the polarized ultraviolet ray irradiation direction in an anti-parallel state, and thermally pressed. Using "FELIX 4851-100" mentioned above, injection was carried out in the same manner as in the example 1, and then it was returned slowly to the room temperature so as to obtain a mono domain and show the mono-stability.

Example 4

Two glass substrates with an ITO coating were spin coated with a 2% by weight solution of a compound A dissolved in a cyclopentanone for 30 seconds by a 4,000 rpm rotational frequency. After drying for 10 minutes at 180° C. in an over, it was exposed at 25° C. by 100 mJ/cm$^2$ from a 30° angle with respect to the substrate surface with a polarized ultraviolet ray. Furthermore, one of the substrates was spin coated with a 2% by weight solution of a compound E dissolved in a cyclopentanone for 30 seconds by a 4,000 rpm rotational frequency for lamination. After drying for 3 minutes at 55° C., it was exposed at 1,000 mJ/cm$^2$ with a non polarized ultraviolet ray at 55° C. Thereafter, a cell was assembled in the method as mentioned above, a liquid crystal was injected thereto. Then, it was returned slowly to the room temperature so as to obtain a mono-domain alignment without an alignment defect.

Example 5

Two glass substrates with an ITO coating were spin coated with a polyimide "RN1199" produced by NISSAN CHEMICAL INDUSTRIES, LTD. for 30 seconds by a 4,000 rpm rotational frequency. After drying for 10 minutes at 180° C. in an oven, it was exposed by 100 J/cm$^2$ with a polarized ultraviolet ray at 25° C. Furthermore, one of the substrates was spin coated with a 2% by weight solution of a compound E dissolved in a cyclopentanone for 30 seconds by a 4,000 rpm rotational frequency for lamination. After drying for 3 minutes at 55° C., it was exposed at 1,000 mJ/cm$^2$ with a non polarized ultraviolet ray at 55° C. Thereafter, a cell was assembled in the method as mentioned above, a liquid crystal was injected thereto. Then, it was returned slowly to the room temperature so as to obtain a mono-domain alignment without an alignment defect.

Comparative Example 3

Using a polyimide "RN1199" produced by NISSAN CHEMICAL INDUSTRIES, LTD. as the alignment film material, two glass substrates with an ITO coating were spin coated for 30 seconds by a 4,000 rpm rotational frequency. After drying for 10 minutes at 180° C. in an oven, it was exposed by 100 J/cm² with a polarized ultraviolet ray at 25° C. Thereafter, a cell was assembled in the method as mentioned above, a liquid crystal was injected thereto. Then, it was returned slowly to the room temperature so as to obtain a double domain and generate the alignment defects such as a zigzag defect and a hairpin defect without obtaining a mono-domain alignment.

Example 6

Two glass substrates with an ITO coating were spin coated with a 2% by weight solution of a compound A dissolved in a cyclopentanone for 30 seconds by a 4,000 rpm rotational frequency. After drying for 10 minutes at 180° C. in an oven, it was exposed at 25° C. by 100 mJ/cm² from a 30° angle with respect to the substrate surface with a polarized ultraviolet ray. Furthermore, one of the substrates was spin coated with a 2% by weight solution of a compound C dissolved in a cyclopentanone, and the other substrate was spin coated with a 2% by weight solution of a compound E dissolved in a cyclopentanone each for 30 seconds by a 4,000 rpm rotational frequency for lamination. After drying for 3 minutes at 55° C., they were exposed at 1,000 mJ/cm² with a non polarized ultraviolet ray at 55°c. Thereafter, a cell was assembled in the method as mentioned above, a liquid crystal was injected thereto. Then, it was returned slowly to the room temperature so as to obtain a mono-domain alignment without an alignment defect.

What is claimed is:

1. A liquid crystal display comprising a reactive liquid crystal side substrate having a first substrate, an electrode layer formed on the first substrate, a first alignment layer formed on the electrode layer, and a reactive liquid crystal layer with a reactive liquid crystal fixed, formed on the first alignment layer, and a counter substrate having a second substrate, an electrode layer formed on the second substrate, and a second alignment layer formed on the electrode layer, wherein the reactive liquid crystal layer of the reactive liquid crystal side substrate and the second alignment layer of the counter substrate are disposed so as to face with each other such that a ferroelectric liquid crystal is sandwiched between the reactive liquid crystal side substrate and the counter substrate, and wherein the ferroelectric liquid crystal shows a chiral smectic C phase via a smectic A phase in a temperature lowering process, and it shows a mono-stability in the chiral smectic C phase.

2. The liquid crystal display according to claim 1, wherein a second reactive liquid crystal layer with the reactive liquid crystal fixed on the second alignment layer is formed, and the reactive liquid crystal comprising the reactive liquid crystal layer and the reactive liquid crystal comprising the second reactive liquid crystal layer are different compositions.

3. The liquid crystal display according to claim 1, wherein the reactive liquid crystal shows a nematic phase.

4. The liquid crystal display according to claim 1, wherein the reactive liquid crystal has a polymerizable liquid crystal monomer.

5. The liquid crystal display according to claim 4, wherein the polymerizable liquid crystal monomer is a monoacrylate monomer or a diacrylate monomer.

6. The liquid crystal display according to claim 5, wherein the diacrylate monomer is a compound represented by a below-mentioned formula (1):

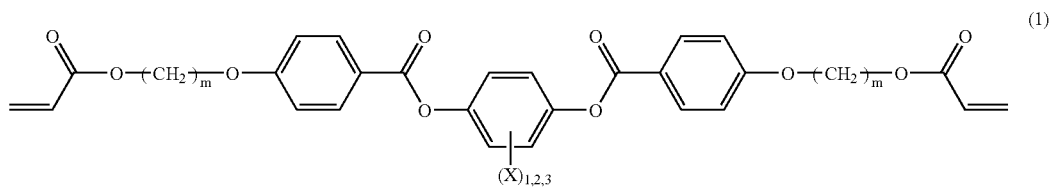

(Here, X in the formula is a hydrogen, an alkyl having 1 to 20 carbon atoms, an alkenyl having 20 or less carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro, and m is an integer in a range of 2 to 20).

7. The liquid crystal display according to claim 5, wherein the diacrylate monomer is a compound represented by a below-mentioned formula (2):

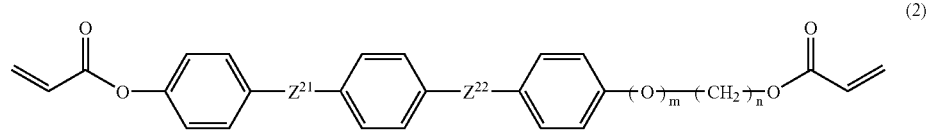

(Here, $Z^{21}$ and $Z^{22}$ in the formula are each independently directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—, m is 0 or 1, and n is an integer in a range of 2 to 8).

8. The liquid crystal display according to claim 1, wherein the first alignment layer and the second alignment layer are a photo alignment layer.

9. The liquid crystal display according to claim 8, wherein a constituent material for the photo alignment layer is a photoreactive material for providing an anisotropy to the photo alignment layer by generating a photoreaction, or a photo isomerization type material including a photo isomerization-reactive compound for providing the anisotropy to the photo alignment layer by generating a photo isomerization reaction.

10. The liquid crystal display according to claim 1, wherein the ferroelectric liquid crystal comprises a single phase.

11. The liquid crystal display according to claim 1, to be driven by an active matrix system using thin film transistors.

12. The liquid crystal display according to claim 1, to be driven by a field sequential color system.

* * * * *